United States Patent [19]

Terajima

[11] Patent Number: 5,155,602
[45] Date of Patent: Oct. 13, 1992

[54] DATA COMMUNICATION APPARATUS WITH USAGE-REPORTS BY USER

[75] Inventor: Hisao Terajima, Yokohama, Japan

[73] Assignee: Canon Kabushiki Kaisha, Tokyo, Japan

[21] Appl. No.: 686,155

[22] Filed: Apr. 16, 1991

[30] Foreign Application Priority Data

Apr. 19, 1990 [JP]  Japan .................. 2-104213

[51] Int. Cl.⁵ .............................. H04N 1/00
[52] U.S. Cl. ................................. 358/440
[58] Field of Search ................. 358/434–440, 358/403, 406, 444; 379/34; 370/17; 375/3.1

[56] References Cited

U.S. PATENT DOCUMENTS

| | | | |
|---|---|---|---|
| 4,729,637 | 3/1988 | Sato et al. | 350/339 F |
| 4,843,479 | 6/1989 | Yoshino et al. | 358/257 |
| 4,870,503 | 9/1989 | Miura | 358/440 |
| 4,916,732 | 4/1990 | Kotani et al. | 358/440 |
| 5,001,572 | 3/1991 | Hashimoto et al. | 358/440 |

*Primary Examiner*—Stephen Brinich
*Attorney, Agent, or Firm*—Fitzpatrick, Cella, Harper & Scinto

[57] ABSTRACT

A data communication apparatus which has a memory storing communication-result information including user names; a recorder for recording communication-result information from the memory; and a controller for selecting communication-result information relating to a given user name from among the communication-result information and recording the selected information.

9 Claims, 6 Drawing Sheets

FIG. 2

| COMM MODE | TEL NUMBER OF CALLED STATION | ABBR. NAME OF CALLED STATION | USER NAME AT CALLING STATION | START TIME | COMM PERIOD | NUMBER OF SHEETS | RESULT OF COMM | CHARGE | |
|---|---|---|---|---|---|---|---|---|---|
| SEND | ...... | ...... | BUSINESS SECTION | ...... | 01:32 | 2 | OK | 10 | } ONE RECORD |
| SEND | ...... | ...... | GENERAL AFFAIRS SECTION | ...... | 00:42 | 1 | OK | 10 | |
| RECEIVE | ...... | ...... | | ...... | 00:50 | 1 | OK | 0 | |
| SEND | ...... | ...... | BUSINESS SECTION | ...... | 02:10 | 3 | OK | 10 | |
| SEND | ...... | ...... | GENERAL AFFAIRS SECTION | ...... | 03:20 | 4 | OK | 20 | |

40 RECORDS

FIG. 3

| COMM MODE | TEL NUMBER OF CALLED STATION | ABBR. NAME OF CALLED STATION | USER NAME AT CALLED STATION | START TIME | COMM PERIOD | NUMBER OF SHEETS | RESULT OF COMM | CHARGE |
|---|---|---|---|---|---|---|---|---|
| RECEIVE | ...... | ...... | | ...... | 01:30 | 3 | OK | 0 |
| RECEIVE | ...... | ...... | | ...... | 00:25 | 1 | OK | 0 |

TIMES OF COMM 2    COMM PERIOD 1:55    NUMBER OF SHEETS 4    CHARGE 0

| SEND | ...... | ...... | THE FIRST BUSINESS SECTION | ...... | 01:32 | 2 | OK | 10 |
| SEND | ...... | ...... | THE FIRST BUSINESS SECTION | ...... | 02:10 | 3 | OK | 10 |
| SEND | ...... | ...... | THE FIRST BUSINESS SECTION | ...... | 00:53 | 1 | OK | 10 |

THE FIRST BUSINESS SECTION    TIMES OF COMM 3    COMM PERIOD 4:35    NUMBER OF SHEETS 6    CHARGE 30

| SEND | ...... | ...... | GENERAL AFFAIRS SECTION | ...... | | | | |
| SEND | ...... | ...... | GENERAL AFFAIRS SECTION | ...... | 03:20 | 4 | OK | 20 |

GENERAL AFFAIRS SECTION    TIMES OF COMM 5    COMM PERIOD 10:28    NUMBER OF SHEETS 13    CHARGE 80

DATA COMMUNICATION APPARATUS WITH USAGE-REPORTS BY USER

BACKGROUND OF THE INVENTION

1. Field of the Invention

The present invention relates to a data communication apparatus, and more particularly to a data processing apparatus which can output a communication control report of data communication.

2. Related Background Art

A facsimile device has been known as one of the devices of this type. A plurality of user names are registered in the facsimile device. An operator selects his/her user name to send an image, and the user name is inserted at the top of the scanned image. In a transmitter which complies with the G3 standard, the user name is inserted in the TSI signal so that the receiving party can recognize the user name.

Further, the user names are listed in a communication result report at the sending device so that users can recognize who sent what messages and how many.

However, in the prior art device, a plurality of part communication results are outputted in the communication result report in the order of communication. Accordingly, where it is desired to know the total communication amount for a particular user, the operator must manually select the communication results of the particular user from the communication results arranged in the order of communication. This work is troublesome.

U.S. Pat. Nos. 4,843,479, 4,729,637 and 4,870,503 relate to devices of this type but none of them proposes a solution to the above problem.

SUMMARY OF THE INVENTION

In the light of the above, it is an object of the present invention to improve a data communication apparatus.

It is another object of the present invention to provide a data communication apparatus which can output a communication result report by user name.

It is another object of the present invention to provide a data communication apparatus which can output a cumulative communication result report for a designated user name.

It is another object of the present invention to provide a data communication apparatus which can output communication result records of the same user adjacently, from the communication result reports of a plurality of user names.

The another objects of the present invention will be apparent from the following detailed description of the preferred embodiment and the accompanying drawings.

DETAILED DESCRIPTION OF THE PREFERRED EMBODIMENT

One embodiment of the present invention is now described with reference to the drawings.

Figure 1:
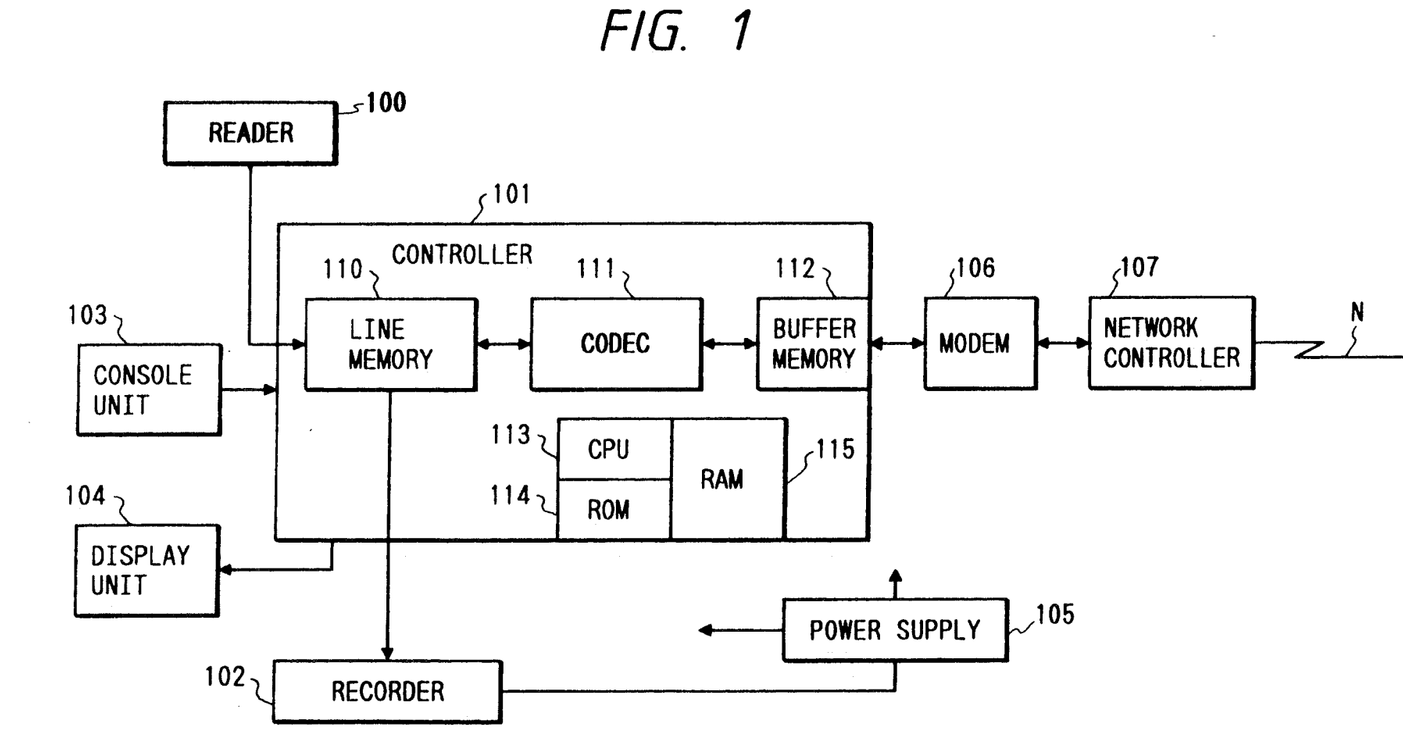
FIG. 1 shows a block diagram of a facsimile device in accordance with one embodiment of the present invention.

FIG. 1 shows a block diagram of a facsimile device in accordance with one embodiment of the present invention.

In FIG. 1, a controller 101 comprises a CPU 113, a ROM 114, a RAM 115, a buffer memory 112, a line memory 110 and an encoder/decoder 111, and controls image input/output and an overall communication process.

The ROM 114 stores a control program shown in FIGS. 4–6 and to be described later. The RAM 115 is used as a work area for the CPU 113.

The image input and output are performed by a reader 100 and a recorder 102.

Document image data is read by the reader 100 which comprises a CCD sensor and a document feeder. Received image data or image data read by the reader 100 is a copy mode is recorded on a record sheet by the recorder 102 which may be a thermal printer or an ink jet printer.

The input and output of the image data between the reader 100 and the recorder 102, and the encoder/decoder 111 are performed through a line memory 110 line by line. The input and output of data between the encoder/decoder 111 and the communication circuit are controlled by a buffer memory 112 having a unit of processing which is larger than one line (for example, a certain number of pages). The encoder/decoder 111 encodes and decodes in a known manner such as the MH, MR or MMR system to suppress redundancy. It may alternatively be embodied in software of the CPU 113.

The connection with a communication line N such as a telephone line and the input and output of data are performed by a modem 106 and a network controller 107 a telephone set (or a hand set) 16 for speech communication and manual control is connected to the network controller 107.

The communication operation is controlled through a console panel 103 which comprises a ten-key for entering a telephone number and various function keys. A display 104 for displaying a telephone number and time is provided on the console panel 103.

Power necessary to drive the device is supplied from a power supply 105 which may be a switching power supply. The supply of powers to the respective units is also controlled by the controller 101.

Figure 2:
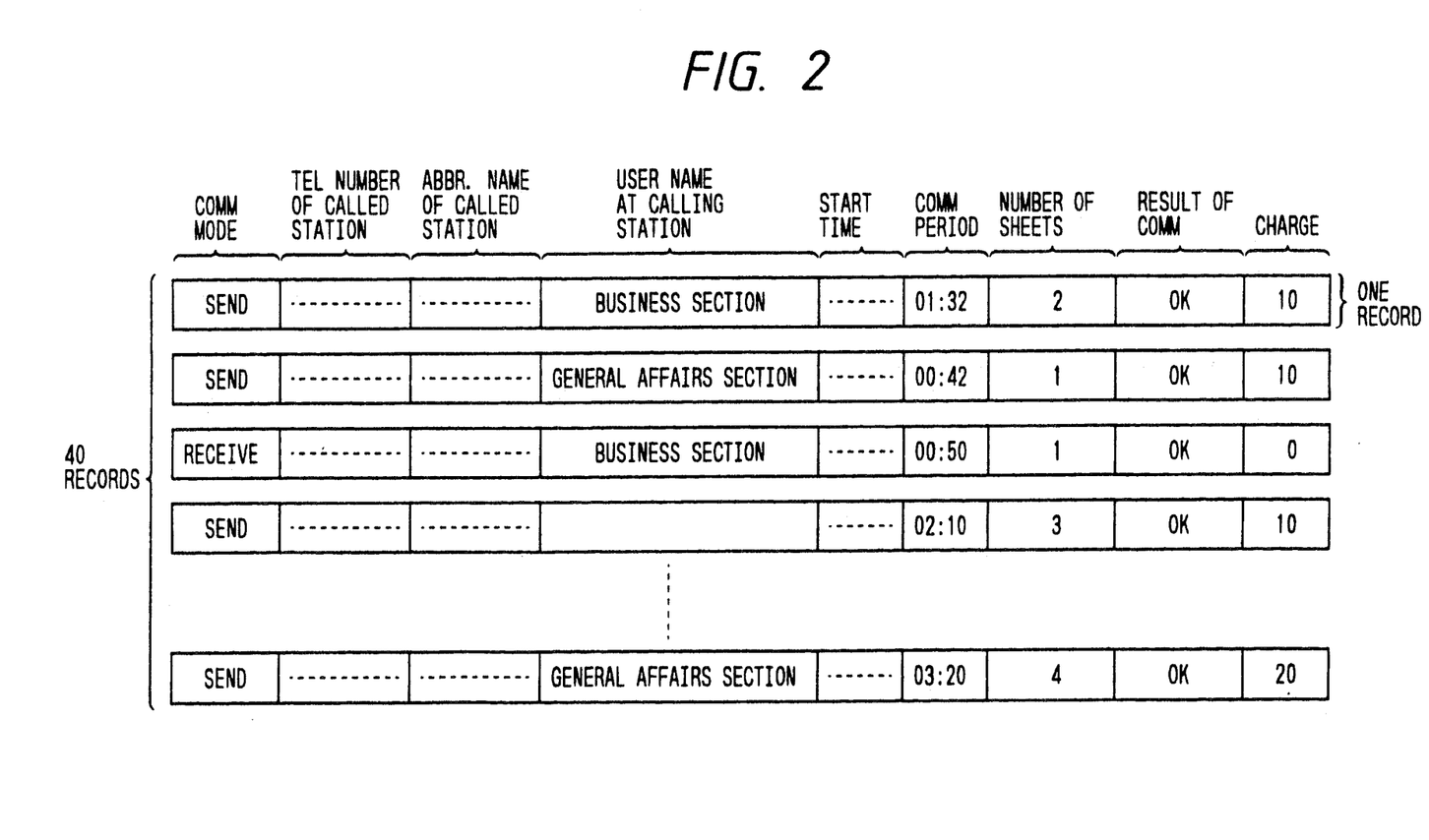
FIG. 2 shows a content of a communication result in the embodiment of FIG. 1.

In the present embodiment, information on communication report for one unit of communication (hereinafter one record) comprises a communication mode, a destination telephone number, a destination abbreviation, user name, a start time, a communication time, a number of sheets, a communication result and a charge, as shown in FIG. 2.

Forty latest records of the communication result information can be stored in the RAM 115.

Figure 3:
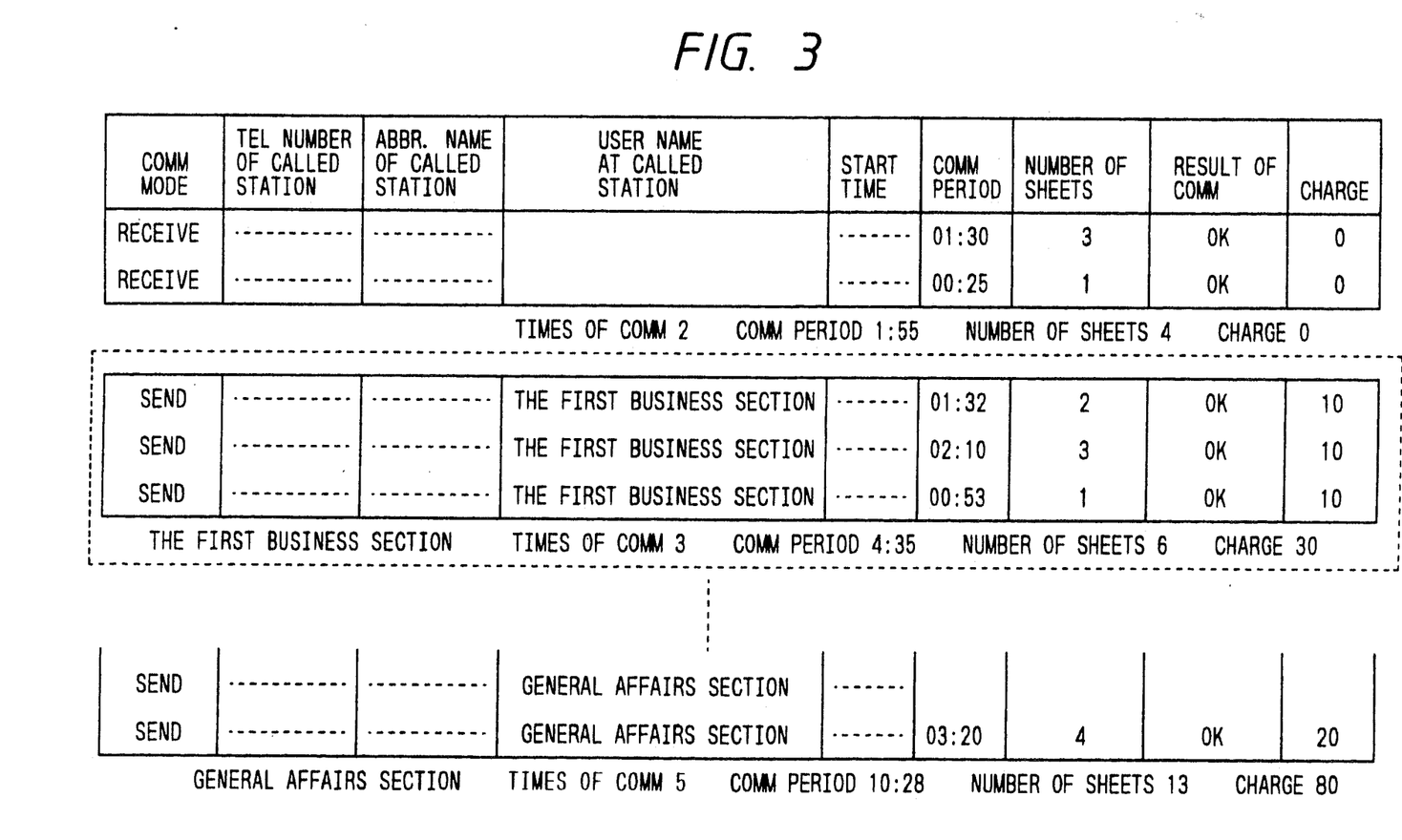
FIG. 3 shows a communication result report in the embodiment of FIG. 1.

When the communication results are to be outputted as a report, they are outputted by user name as shown in FIG. 3, and totals of the number of times of communication, the communication times, the numbers of sheets and the charges for each user name are outputted.

Figure 4:
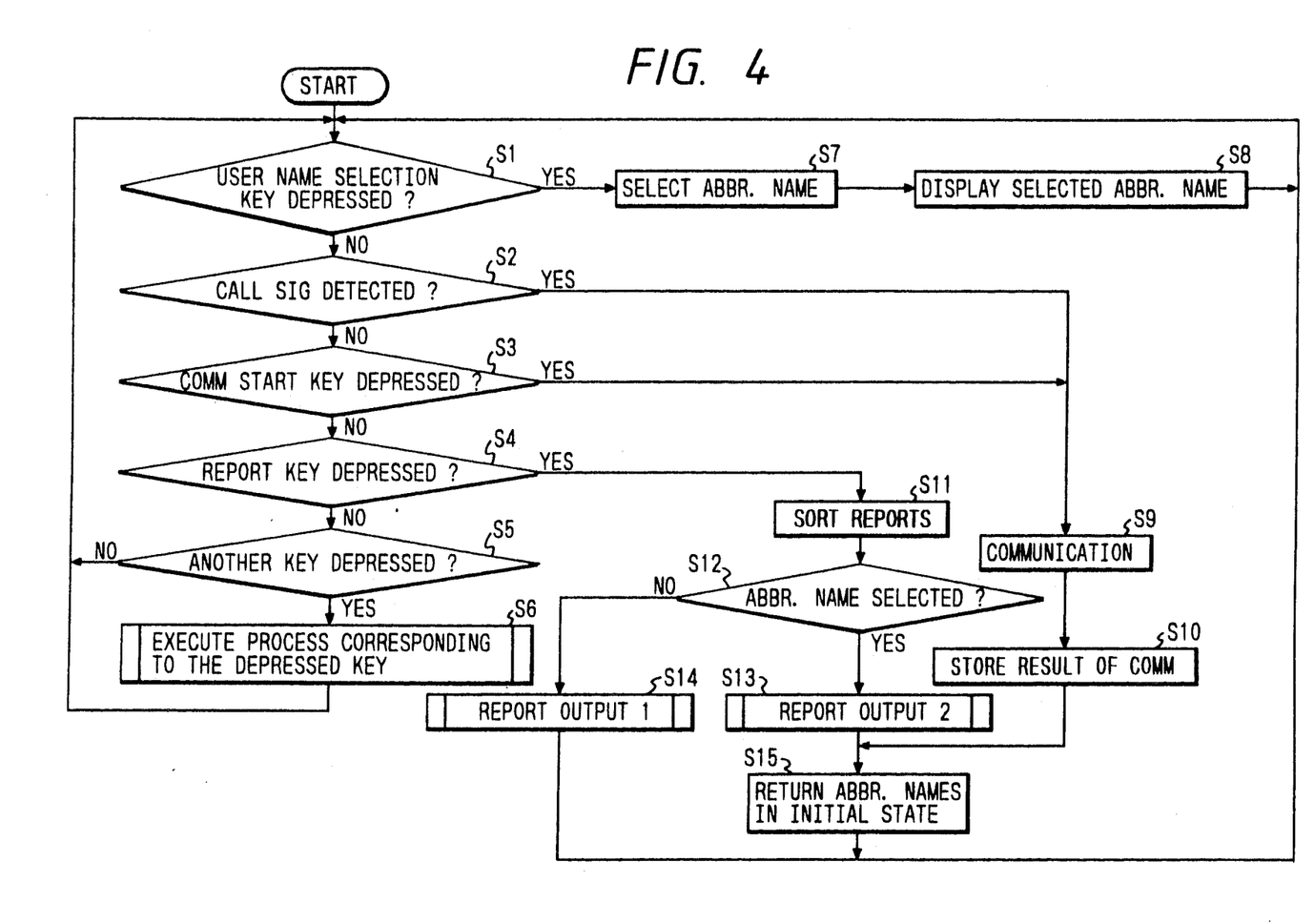
FIG. 4 shows a flow chart of an operation of a controller in the embodiment of FIG. 1.

FIG. 4 shows a flow chart of an operation of the controller 101.

In a stand-by mode, if there is no key entry or calling tone from the telephone line, steps S1–S5 are looped to wait for an external input.

Unless the user selects one of ten user names which are registerable, an initially designated one is selected.

When the user depresses an abbreviation switch (which switches user names) on the console panel 104 (S1), the next user name is selected (S7), it is displayed on the display 104 (S8), and the process returns to the stand-by loop (S1–S5).

If the abbreviation key is continuously depressed, the above operation is repeated so that ten user names are cyclically selected and displayed.

When a calling signal (telephone bell) is detected (S2), or when a start of communication key is depressed (S3), a receiving or transmitting operation is started (S9). Information on the communication results (communication mode, destination telephone number, destination abbreviation, own user name, start time, communication time, number of sheets, communication result and charge) is stored into the memory 15 as shown in FIG. 2, and the process returns to stand-by loop (S1–S5) (S10). In the transmission mode, the user name last selected in the step S7 is stored, and in the reception mode, it is left blank.

When a report key is depressed in the stand-by loop (S4), the memory is stored by record, using the user name as a key (S11).

In the present embodiment, the user name is stored in the form of a JIS character code. Accordingly, the contents of the memory are sorted in the sequence of character code. A known sorting method such as a bubble sorting method or a shell sorting method may be used.

If a particular user name is selected instead of the initially set user name (S12), a report for only the particular user name is outputted (S13), and the user name is reset to the initially set user name, and the process returns to the stand-by loop (S15). If the user name is the initially set one in S12, all reports are outputted and the process returns to the stand-by loop (S14).

Figure 5:
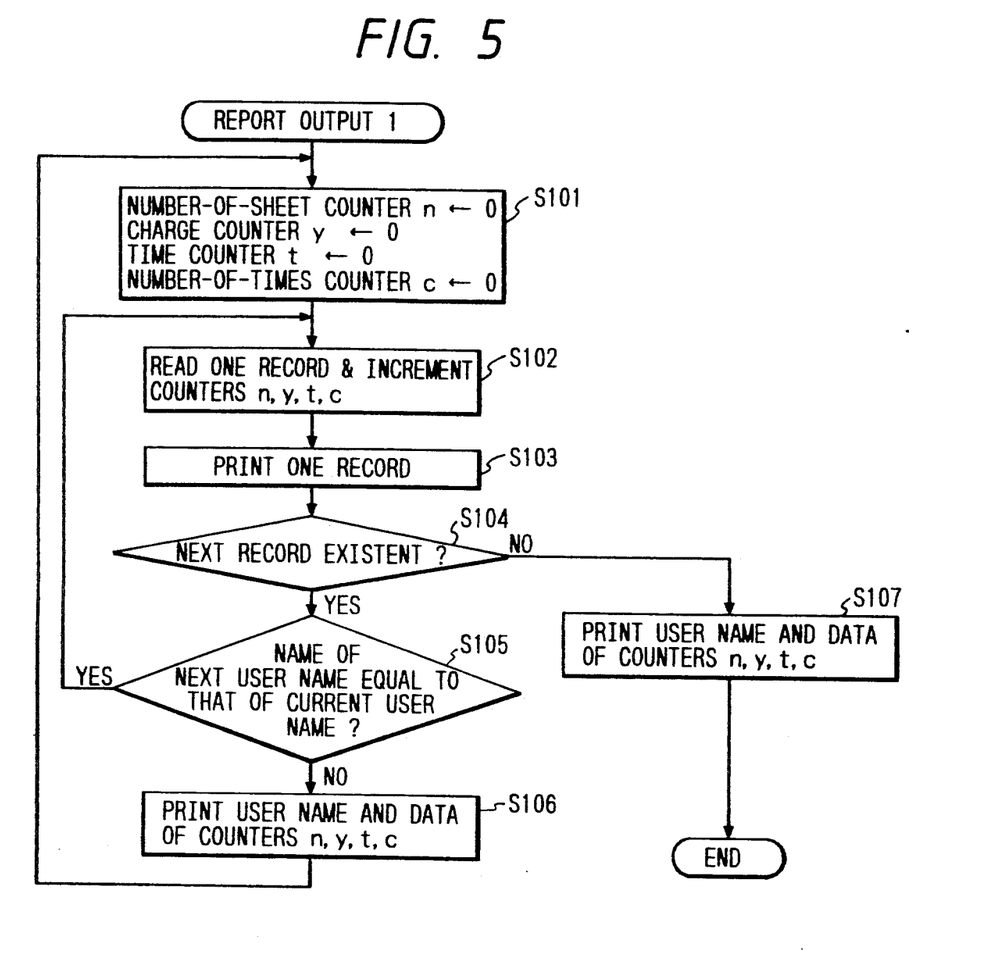
FIG. 5 shows a flow chart of a first report output operation in the embodiment of FIG. 1

FIG. 5 shows a flow chart of the report output operation in the step S14.

Counters for counting the total number of sheets, charge, time and number of times of communication for each user name are cleared (S101). One record of communication result is read from the memory, and a sheet counter n, a charge counter y, a time counter t and communication counter c are counted up by the respective communication results (S102) and the records are printed (S103).

The presence or absence of the next record is determined (S104). If there is a next record, the user name of the next record is determined (S105).

If the user name of the next user is identical to the printed record, the process repeats the printing in S102. If the user name is different, the sheet counter n, the charge counter y, the time counter t and the communication counter c must represent the total number of sheets, charge, time and number of times of the user names printed out so far, and they are printed out together with the user names (S106).

The process returns to S101 to clear the sheet counter n, the charge counter y, the time counter t and the communication counter c and start the counting for the next user name.

If there is no next record in S104, the sheet counter n, the charge counter y, the time counter t and the communication counter c represent a total of the records having the user names printed out so far. Thus, the user names and the records are printed out and the record print step is terminated (S107).

Accordingly, when the record is outputted without selecting a particular user name in the stand-by mode, a record which includes the communication results by user name as well as total number of sheets, charge, time and number of times for each user name are printed out, as shown in FIG. 5.

Figure 6:
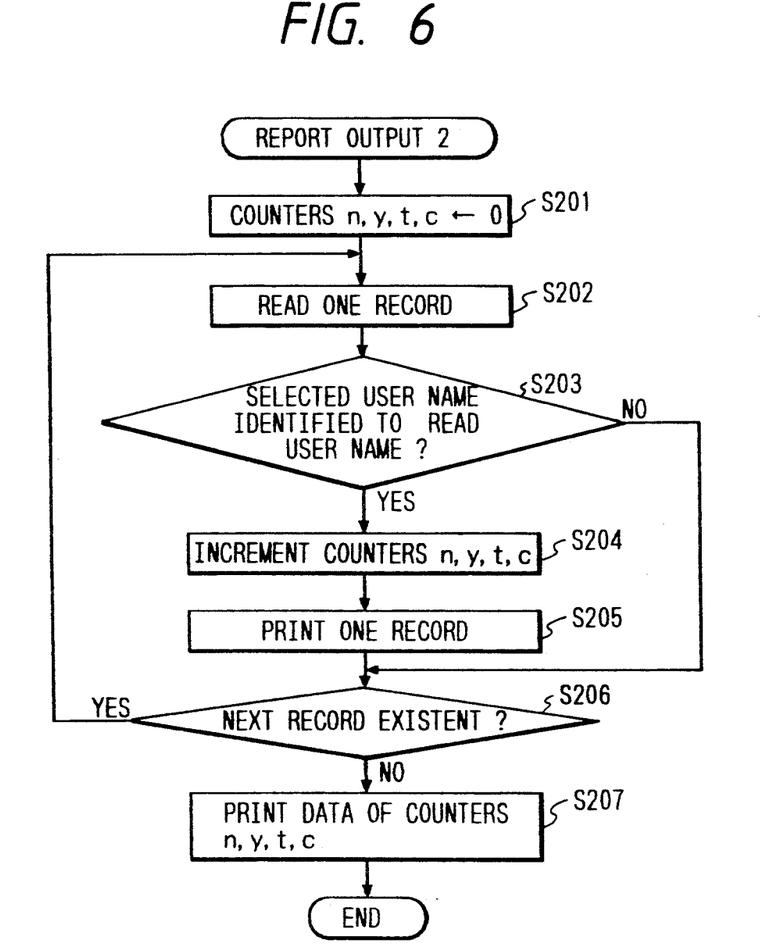
FIG. 6 shows a flow chart of a second report output operation in the embodiment of FIG. 1.

FIG. 6 shows a flow chart of the report output operation in S13.

The sheet counter n, the charge counter y, the time counter t and the communication counter c are cleared (S201) and one record is read from the memory (S202). Since a different user name than the initially set one has been selected in S7, the selected user name is compared with a recognized user name. If they do not match, the process proceeds to S206, and if there is a next record, the steps starting from S202 are repeated.

If the user names match in S203, the sheet counter n, the charge counter y, the time counter t and the communication counter c are updated, and the record is printed out. Then, the process proceeds to S206 (S205).

In this manner, the report is processed for the record having the user name which matches to the user name selected in S7. When there is no next record, the user name as well as the sheet counter n, the charge counter y, the time counter t and the communication counter c are printed out (S207), for example, a portion of FIG. 3 encircled by broken lines is printed out. Thus, only a report which includes the particular user name is selectively outputted.

As described above, since the communication result reports are outputted by user name and the total number of sheets, time, charge and number of times for each user name are printed out, it is easy to determine who sent which messages and how many, and how much the charge is, where one facsimile device is shared by a plurality of departments in a company, charge control for the respective departments can be readily performed.

When a use status of a particular user is to be checked, the user name is selected in the report output operation so that the report of only that user is outputted, and thus rapid processing is attained.

In the present embodiment, both the function to output only the report which includes the particular user name and the function to output the reports by user are used, although an advantage over the prior art device is attained even when only one of the functions is used.

In the above embodiment, the facsimile device is described although the present invention is not limited to the facsimile device but is also applicable to any data communication apparatus such as a teletex.

The present invention is not limited to the above embodiment but various modifications can be made.

What is claimed is:

1. A data communication apparatus comprising:
   store means for storing communication-result information including user names;
   record means; and
   control means for selecting communication-result information relating to a given user name, by means of that user name, from among the communication-result information in said store means and recording the selected information using said record means.

2. A data communication apparatus according to claim 1 further comprising:
   means for registering information representing a plurality of user names; and
   means for selecting one of the information of the plurality of registered user names for data communication.

3. A data communication apparatus according to claim 2 wherein said control means sorts the of communication-result information by the information of the registered user names to output as the record.

4. A data communication apparatus according to to claim 3 wherein said control means calculates a total amount of communication for each user name to output as the record.

5. A data communication apparatus according to claim 1 further comprising means for designating user name in recording the communication-result information, wherein said control means selects the communication-result information having the information representing the designated user name to output as the record.

6. A data communication apparatus comprising;
   means for registering information representing user names;
   means for selecting from among the registered information representing the user names for data communication;
   store means for storing communication-result information including user name information;
   record means; and
   control means for sorting the communication-result information by means of the registered user name information when the communication-result information of said store means is to be recorded.

7. A data communication apparatus according to claim 6 wherein said control means calculates a total amount of communication for each user name to output as the record.

8. A method for recording communication-result information in a data communication apparatus for recording communication-result information including information representing user names, comprising the steps of:
   selecting communication-result information having the same user name from among the communication-result information; and
   recording the selected communication-result information.

9. A method for recording communication result information according to claim 8 further comprising the steps of:
   designating a user name to be recorded; and
   selecting the communication result information including the designated user name from the of communication-result information and recording the selected information.

* * * * *

UNITED STATES PATENT AND TRADEMARK OFFICE
CERTIFICATE OF CORRECTION

PATENT NO. : 5,155,602
DATED : October 13, 1992
INVENTOR(S) : HISAO TERAJIMA

It is certified that error appears in the above-identified patent and that said Letters Patent is hereby corrected as shown below:

COLUMN 1

Line 51, "The another" should read --The other--.

COLUMN 2

Line 24, "is" (first occurrence) should read --in--.
    Line 42, "107 a" should read --107. A-- and
          "hand set) 16" should read --handset)--.
    Line 53, "powers" should read --power--.

COLUMN 3

Line 23, "memory 15" should read --memory 115--.

COLUMN 5

Line 11, "of" should be deleted.
    Line 14, "to to" should read --to--.

COLUMN 6

Line 22, "communication result" should read
          --communication-result--.
    Line 26, "communication result" should read
          --communication-result--.

UNITED STATES PATENT AND TRADEMARK OFFICE
CERTIFICATE OF CORRECTION

PATENT NO. : 5,155,602
DATED : October 13, 1992
INVENTOR(S) : HISAO TERAJIMA

It is certified that error appears in the above-identified patent and that said Letters Patent is hereby corrected as shown below:

COLUMN 6

Line 27, "of" should be deleted.

Signed and Sealed this

Twenty-sixth Day of October, 1993

Attest:

BRUCE LEHMAN

Attesting Officer    Commissioner of Patents and Trademarks